US009078082B2

(12) United States Patent
Gill et al.

(10) Patent No.: US 9,078,082 B2
(45) Date of Patent: Jul. 7, 2015

(54) INTERACTING WITH CLOUD-BASED APPLICATIONS USING UNRELATED DEVICES

(75) Inventors: Sunbir Gill, Seattle, WA (US); Brandon C. Bell, Bellevue, WA (US); Piragash Velummylum, Seattle, WA (US); Ethan Z. Evans, Snoqualmie, WA (US); Lars Brubaker, Trubuco Canyon, CA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 12/890,244

(22) Filed: Sep. 24, 2010

(65) Prior Publication Data

US 2012/0079119 A1    Mar. 29, 2012

(51) Int. Cl.
*G06F 15/16* (2006.01)
*H04W 4/00* (2009.01)

(52) U.S. Cl.
CPC .............. *H04W 4/003* (2013.01); *H04W 4/001* (2013.01)

(58) Field of Classification Search
CPC ... H04L 29/05; H04L 67/02; H04L 29/08072; H04L 41/0213; H04N 5/4403; H04N 21/42204; H04N 21/4126; G06F 3/017; G06F 21/305; G06F 3/0482; G06F 17/30058; H04M 1/72533; A61H 2201/5007; A61H 2201/501; A61H 2201/5012; H04W 4/003; H04W 4/001
USPC .......... 709/227, 223–224, 203, 217, 219, 246
See application file for complete search history.

(56) References Cited

U.S. PATENT DOCUMENTS

| 2007/0033107 | A1* | 2/2007  | Ubale et al. ................. 705/14 |
| 2007/0239911 | A1* | 10/2007 | Finnerty et al. .............. 710/65 |
| 2008/0059535 | A1* | 3/2008  | Lindsley et al. ............. 707/200 |
| 2010/0017417 | A1* | 1/2010  | Ronning et al. .............. 707/10 |
| 2010/0241962 | A1* | 9/2010  | Peterson et al. ............. 715/720 |
| 2010/0241966 | A1* | 9/2010  | Kim et al. ................... 715/740 |
| 2010/0306811 | A1* | 12/2010 | Adimatyam et al. ......... 725/110 |
| 2011/0090407 | A1* | 4/2011  | Friedman ..................... 348/734 |
| 2011/0299832 | A1* | 12/2011 | Butcher ....................... 386/248 |

FOREIGN PATENT DOCUMENTS

| WO | WO 2004/107099 | 12/2004 |
| WO | WO 2007/075376 | 7/2007  |

OTHER PUBLICATIONS

International Search Report for PCT/US2011/051811, Amazon Technologies, Inc., dated Nov. 28, 2011, 9 pgs.

* cited by examiner

*Primary Examiner* — Oanh Duong
(74) *Attorney, Agent, or Firm* — Knobbe, Martens, Olson & Bear, LLP

(57) ABSTRACT

Systems and method provide logic facilitating an interaction between a networked server and multiple, unrelated devices. In one implementation, a computer-implemented method enables a user of a device to interact with or control multiple, unrelated devices across a could computing environment using a networked server. The method includes receiving, at the networked server, an instruction from the control device. A corresponding instruction understandable by an unrelated controlled device is generated by the networked server, and the corresponding instruction is operable to cause the controlled device to perform the received instruction. The networked server may transmit the corresponding instruction to the controlled device.

27 Claims, 10 Drawing Sheets

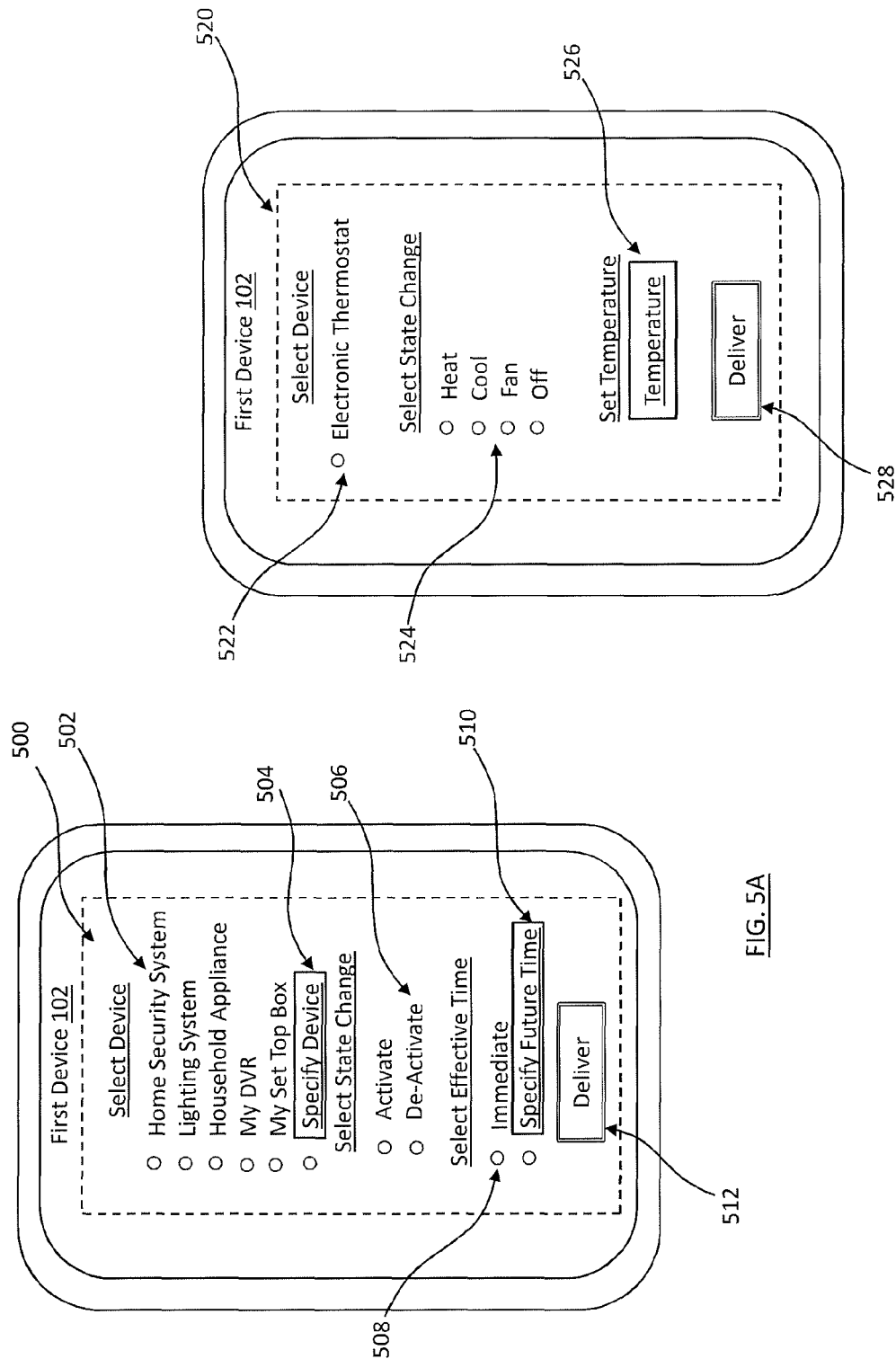

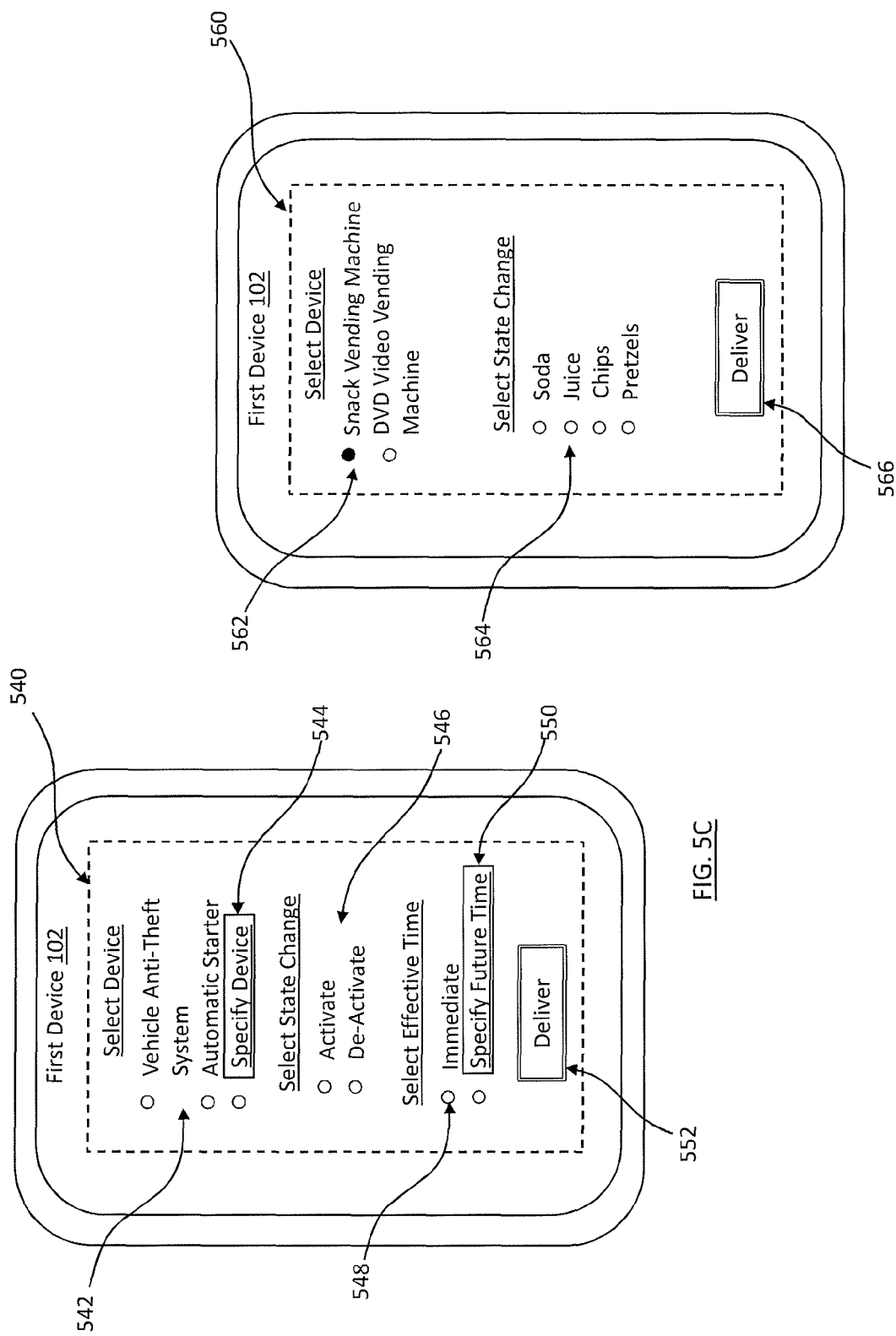

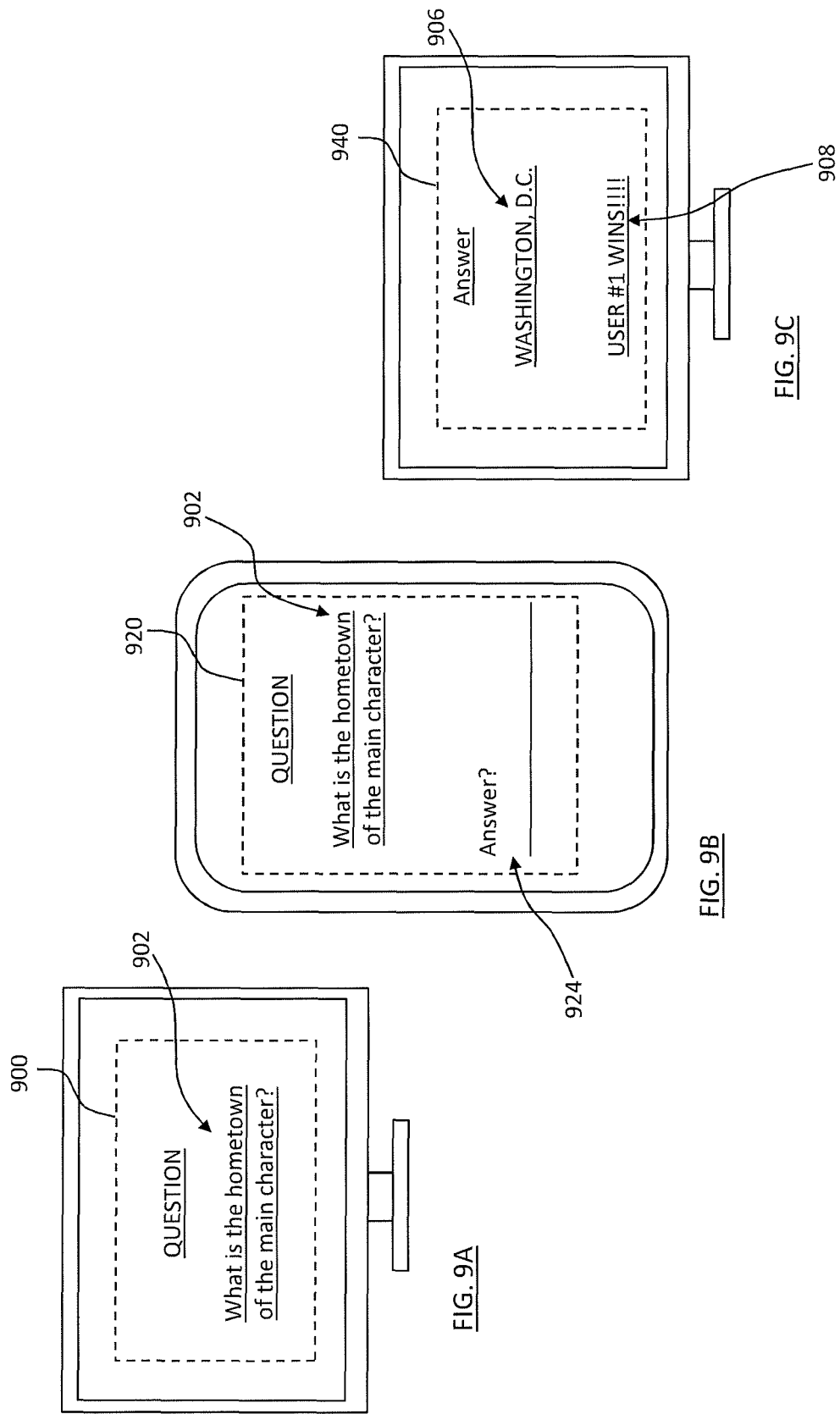

INTERACTING WITH CLOUD-BASED APPLICATIONS USING UNRELATED DEVICES

BACKGROUND

Online entities offer a wide variety of electronic content and services to a variety of different devices, including personal computers (PCs), electronic book viewers, portable digital assistants (PDAs), mobile telephones, pocket PCs, smart phones, televisions, set-top boxes, digital video recorders (DVRs), and gaming consoles. These devices often access various web pages and web services, such as those associated with online stores or other providers of audio/visual content, software programs, digital books, or other electronic content.

For example, high-resolution televisions, such as those incorporating LCD and plasma technologies, are now capable of connecting to the Internet and accessing electronic resources of a cloud computing network. Such resources, which include services that stream digital videos, services that stream output of electronic games, and services that provide access to stored digital images and videos, are particularly suited to the large-scale, high-resolution displays of modern LCD and plasma televisions. However, despite advances in display technology, such televisions are often controlled by related devices, such as remote controls that come with the television. Moreover, other devices are also often controlled by related devices that are included with, or provided as part of, the devices. For example, alarm systems and other household appliances do not provide users with the ability to control these devices separately from related controls either built-in to the devices or included with the devices.

In view of the foregoing, there is a need for improved systems and methods for controlling a device without being required to use a related device that is specific to the device being controlled.

BRIEF DESCRIPTION OF THE DRAWINGS

The accompanying drawings, which are incorporated in and constitute a part of this disclosure, illustrate various disclosed embodiments. In the drawings:

FIGS. 5A-5D illustrate exemplary user interfaces;

FIGS. 9A-9C depict exemplary content associated with an interactive quiz game.

DETAILED DESCRIPTION

Figure 1:
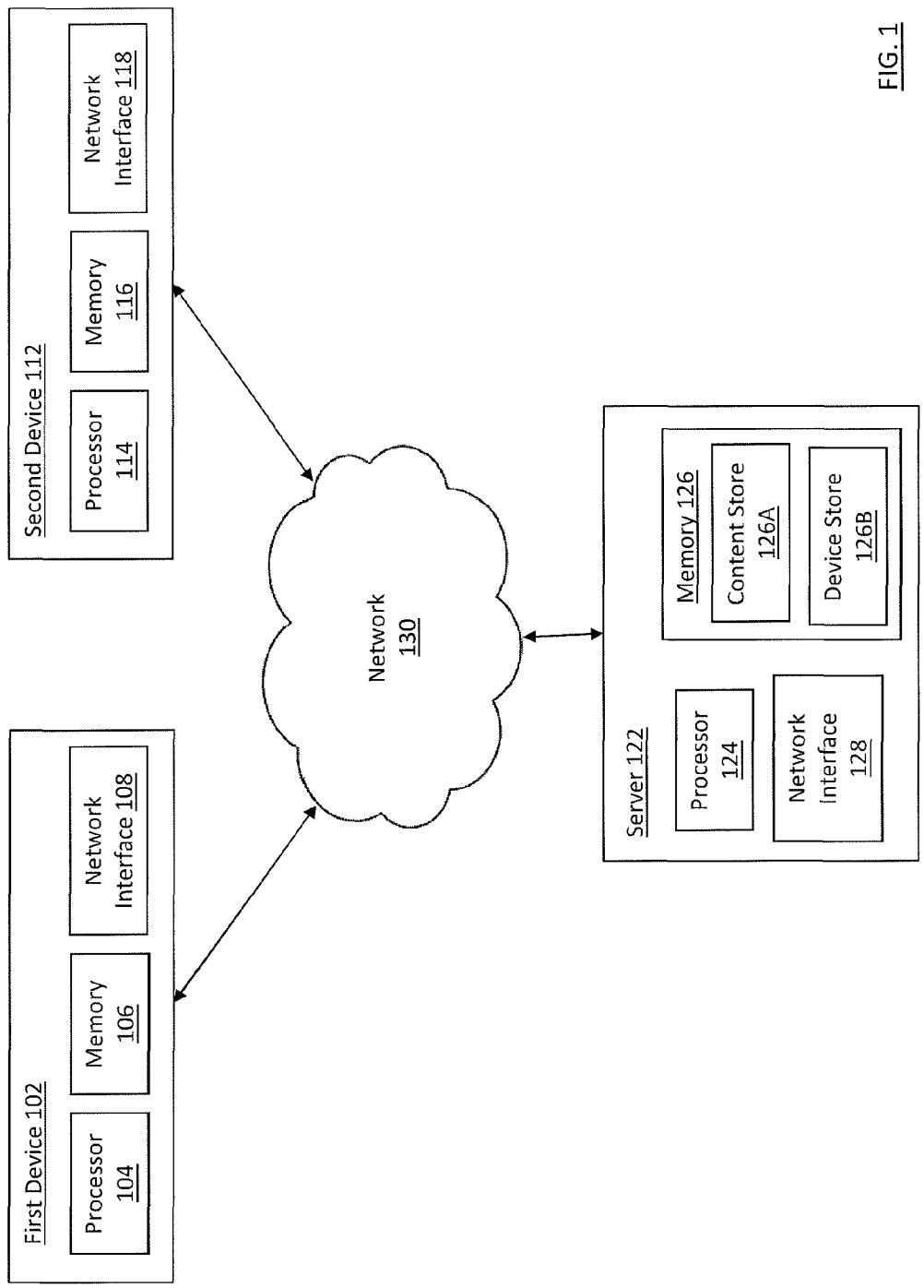
FIG. 1 is a diagram of an exemplary architecture of a system.

Disclosed systems and methods enable a user of a first device to interact with and control one or more additional, unrelated second devices within in a cloud computing environment using a networked server. The user of the first device executes a widget, plug-in, or other application program to generate an interface on the first device. Using the interface, the user generates a request to interact with or control an unrelated second device, and an instruction including the request is transmitted from the first device to the networked server. For example, the user may request a delivery of electronic content to the unrelated second device, a change in an operational state of the unrelated second device, or an interaction with a user of the unrelated second device, or with users of similar unrelated devices, within the cloud computing environment. Based on the instruction from the first device, the networked server generates a corresponding instruction that is compatible with the unrelated second device, and transmits the corresponding instruction to the unrelated second device. After receiving the instruction, the unrelated second device performs an action consistent with the instruction received from the first device. For example, the unrelated second device may retrieve content at a time or date consistent with the instruction, or alternatively, may modify its operational state consistent with the instruction.

As an example, a user of an iPhone or a Blackberry may execute a widget to generate an interface associated with a video-on-demand service or a web-based television service. Through the interface, the user may schedule a recordation of electronic content to an unrelated digital video recorder (DVR) within the cloud computing environment. For example, the interface may be generic and may not be tied to a particular brand of DVR. Thus, the interface may only request that the user enter a time and date of the desired recording or a name of a television program. The networked server may translate the request into a format understood by the user's DVR. Upon receipt of the instruction, the unrelated second device may record the television program in accordance within the instruction.

In an additional example, the user of the iPhone or the Blackberry may execute a widget to generate a corresponding interface, and through the interface, the user may request a change in an operational state of an unrelated device within the cloud computing environment. For example, the user of the iPhone or Blackberry may request an activation or deactivation of a home security system or home appliance at a selected time or date. Additionally, the interface may allow the user of the iPhone or Blackberry device to specify a threshold temperature at which an electronic thermostat activates a heating or cooling device. Once the user specifies the requested modification, the iPhone or Blackberry may transmit an instruction including the request to the networked server, which may forward a corresponding instruction to the unrelated device. Upon receipt of the instruction, the unrelated device may modify its operational state in accordance with the request.

As another example, the user of the iPhone or Blackberry may participate in an electronic gaming application with one or more geographically-dispersed users of unrelated devices within the cloud computing environment. As yet another example, the user of the iPhone or Blackberry may select an element of audio-visual content displayed through a corresponding interface, and may coordinate with the networked server to schedule delivery of additional electronic content associated with the selection to one or more unrelated devices within the cloud computing environment.

FIG. 1 is a diagram of an exemplary architecture of a computing system 100, consistent with disclosed embodiments. In FIG. 1, system 100 includes a network 130 that interconnects a first device 102, a second device 112, and a server 122. First device 102 and second device 112 may be unrelated devices, and system 100 may provide functionality that allows a user of first device 102 to interact with and control unrelated second device 112 across network 130 using server 122. Although a first device, a second device, and an single server are depicted in FIG. 1, system 100 may include any additional or alternate number of servers and unrelated devices. Furthermore, one or more of the components of system 100 may be combined and/or divided into subcomponents.

First device 102 may include, but is not limited to, a mobile telephone, a smart phone, an voice-over-IP (VOIP) telephone, a personal digital assistance having wireless communication capability, a video game controller, a tablet personal computer (PC), a notebook computer, a laptop computer, or any additional or alternate device operable to transmit and receive data across network 130. Second device 112 may include devices similar to those discussed above regarding first device 102. Additionally, second device 112 may include, but is not limited to, a home security system, a household appliance (e.g., a lighting system or a garage door opener), an electronic thermostat, a display device (e.g., a flat screen television, a LCD television, a plasma television, a projection-screen television, or a projection system), a set-top box, a digital video recorder (DVR), a web-enabled media player (e.g., a DVD player), a vehicle anti-theft system, an automatic vehicle ignition system, an electronic vending machine 120, and any additional or alternate device capable of transmitting data across network 130.

First device 102 may include a processor 104, a memory 106, and a network interface 108 for communicating via network 130. Second device 112 may also include a processor 114, a memory 116, and a network interface 118 for communicating via network 130. Processors 104 and 114 may be configured to execute instructions and to process data to perform one or more functions associated with system 100, such as one or more of the methods described below.

Memories 106 and 116 may include one or more memory devices that store data, including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or another other data storage devices known in the art. Memories 106 and 116 may also store operating systems, such as DOS, Windows, or Linux, and may also include one or more application programs, such as word processing, database programs, spreadsheet programs, presentation programs, and graphics programs, and/or other programs capable of generating documents or other electronic content. Furthermore, memories 106 and 116 may include browser applications capable of rendering standard Internet content, such as Netscape Navigator, Microsoft Internet Explorer, and/or Mozilla Firefox. Application programs may be implemented using applets, plug-ins, modules, widgets, and/or any other software components.

Network interfaces 108 and 118 may include any communication device for sending and receiving data across network 130. For example, network interfaces 108 and 118 may include a modem, a transceiver, a network communication card, a satellite dish, an antenna, or another network adapter capable of transmitting and receiving data over network 130.

Network 130 may represent any form or medium of digital data communication. Examples of network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet, a private network, and an intranet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, network 130 may also include one or more mobile device networks, such as a GSM network or a PCS network, that allow mobile devices to send and receive data across network 130 via applicable communications protocols, including those described above.

Server 122 may include a general purpose computer (e.g., a personal computer, network computer, server, or mainframe computer) having one or more processors that may be selectively activated or reconfigured by a computer program. However, server 122 is not limited to such exemplary configurations, and in additional embodiments, server 122 be incorporated as a node in a distributed network, and additionally or alternatively, as a networked server in a cloud computing environment. For example, server 122 may communicate via network 130 with one or more additional servers (not shown), which may enable server 122 to distribute processes for parallel execution by the other servers.

Server 122 may include a processor 124, a memory 126, and a network interface 128 that may include functionalities similar to corresponding components of first device 102 and second device 112. Furthermore, memory 124 may also include a content store 126A and a device store 126B.

Content store 126A may include application programs that are executable by processor 124, and with which users of unrelated devices (e.g., first device 102 and second device 112) may interact. For example, the applications of content store 126A may include, but are not limited to electronic games (e.g., video or arcade games), file sharing applications (e.g., application facilitating the distribution of personal photos and images), social networking or micro-blogging applications (e.g., Facebook and Twitter), widgets and plug-ins associated with, for example, web-based television and video-on-demand applications, and any additional or alternate application program, widget, or plug-in.

Content store 126A may also include electronic content that may be accessed by, and delivered to, one or more of the unrelated devices interacting with network 130. For example, the electronic media may include, but is not limited to, digital videos associated with movies and television programs, digital music, podcasts, digital images, and any additional or alternate form of electronic content. Furthermore, in additional to files associated with the electronic content, content store 126A may also include resource identifiers to electronic media stored on additional devices associated with system 100. For example, a resource identifier may include a physical network address (e.g., a network address expressed using a networking addressing protocol of a physical network) associated with a device storing electronic media.

Device store 126B may include information specific to the network connectivity and operational characteristics of one or more devices associated with network 130. For example, device store 126B may include a physical network address for each device associated with network 130. Furthermore, device store 126B may also include additional connectivity parameters associated with the devices of network 130, including, but not limited to, a connection speed, authentication parameters, a connection capability of the device (e.g., an ability to connect to a 3G wireless network), or any additional or alternate parameters.

In additional embodiments, device store 126B may store information identifying the devices associated with network 130. For example, the identifying information may include, but is not limited to, identifiers associated with the devices (e.g., device names, device serial numbers, or device manufacturers), and identifiers associated with users of the devices (e.g., a user name associated with a user of first device 102).

Device store 126B may also store information identifying one or more capabilities of the devices operating within system 100, but not limited to, a display resolution, a display size, a range of operating parameters, or any additional or alternate information. For example, server 122 may use the display specific information to translate instructions received from first device 102 (e.g., instructions associated with a movement of a finger along a touchpad) into a corresponding output presented to a user by second device 112.

In operation, server 122 may enable a user of first device 102 to interact with server 122 over network 130 to exert control over unrelated second device 112. For example, the user of first device 102 may interact with server 122 over network 130 using a widget, plug-in, or other application executing on first device 102 to schedule delivery of content to an unrelated device (e.g., second device 112), in communication with server 122 over network 130. The unrelated device may, for example, display the content to the user, either instantaneously or at a specific time, or store the delivered content for later display.

Additionally or alternatively, the user of first device 102 may interact with server 122 over network 130 through a widget, plug-in, or other application executing on first device 102 to modify an operational state of an unrelated device (e.g., second device 112) in communication with server 122 over network 130. For example, the user may transmit an instruction to server 122 that enables server 122 to activate, de-activate, or modify an operational state of unrelated second device 112.

In additional embodiments, an output of an application program executing on server 122 may be transmitted to one or more unrelated devices within network 130 (e.g., first device 102 and/or second device 112), which may present the output to corresponding users. Users may interact with or exert control over the application through instructions transmitted by the unrelated devices to server 122 across network 130.

Figure 2:
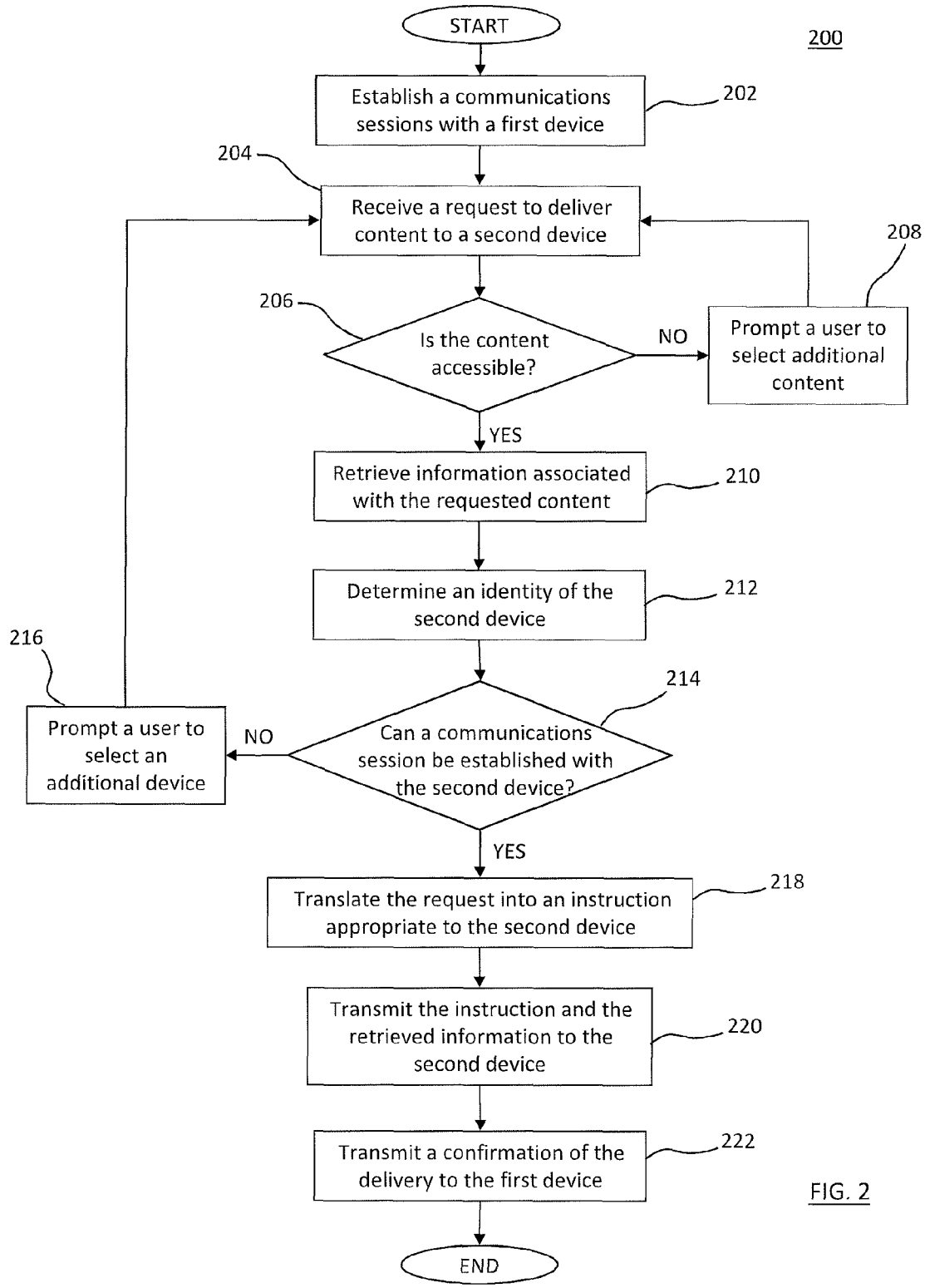
FIG. 2 is a flow diagram of an exemplary routine enabling a first device to deliver content to an unrelated device.

FIG. 2 is a flow diagram of an exemplary routine 200 that facilitates interaction between a server and multiple, unrelated devices, consistent with disclosed embodiments. As described above, system 100 provides functionality that enables a user of a first device (e.g., first device 102) to interact with a server (e.g., server 122) to schedule delivery of content to an additional, unrelated device (e.g., second device 112). Routine 200 provides further details describing how server 122 interacts with first device 102 to deliver content to these additional, unrelated devices over network 130.

In block 202, server 122 may establish a communications session with first device 102. For example, server 122 may attempt to establish the communications sessions with first device 102 using authentication techniques associated with any of the communications protocols outlined above, or using any additional or alternate protocol appropriate to components of system 100.

Server 122 may also obtain device-specific and connection-specific information associated with first device 102 in block 202. For example, such connection-specific information may include, but is not limited to, network addresses, connection speeds, and connection capabilities associated with first device 102. Furthermore, such device-specific information may include, but is not limited to, information identifying the devices, sizes of display screens of the devices, and resolutions of display screen of the devices. The device-specific and connection-specific information obtained by server 122 during block 202 may be stored in a database (e.g., device store 126B).

In block 204, server 122 may receive a request from first device 102 to deliver electronic content to a second, unrelated device (e.g., second device 112) across network 130. The request may specify one or more elements of electronic content, and may specify second device 112 to which the electronic content is to be delivered. For example, the electronic content and second device may be specified by the user through a plug-in or widget associated with server 122 and executed by first device 102, as described below in reference to FIGS. 3A and 3B.

The elements of electronic content may include, but are not limited to, digital videos associated with movies and television programs, digital music, podcasts, digital images, and any additional or alternate form of electronic media apparent to one of skill in the art. Furthermore, as described above, second device 112 may be unrelated to first device 102.

In block 206, server 122 may determine whether the specified elements of electronic content are accessible. For example, server 122 may extract identifiers associated with the specified elements of electronic content from the request, and may compare the identifiers against corresponding information included within content store 126A to determine whether the elements of electronic content are accessible to server 122 and, additionally or alternatively, to second device 112.

If it is determined in block 206 that the electronic content is not accessible, then server 122 may prompt a user of first device 102 to select an additional element of electronic content in block 208. In such an embodiment, server 122 may await receipt of a request specifying the additional element of electronic content in block 204.

However, if it is determined in block 206 that the specified electronic content is accessible, server 122 may retrieve information associated with the specified electronic content in block 210. For example, server 122 may retrieve the specified electronic content from a repository (e.g., content store 126A) associated with server 122. Additionally or alternatively, server 122 may retrieve an address to the specified electronic content from data store 126A, and may, for example, subsequently retrieve the specified electronic content from another data repository within system 100 across network 130.

In block 212, server 122 may determine an identity of the second device 112. The identity of second device 112 may be retrieved from device store 126B. For example, the identity of second device 112 may have been previously designated by the user during a setup process. Alternatively, server 122 may request the identity of the second device 112 using other methods known in the art. Server 122 may then use the identity of the second device 112 to determine an appropriate command to send to second device 112 in order to carry out the request to deliver content to the second device 112.

In block 214, server 122 may attempt to establish a communications session with second device 112 over network 130. If it is determined in block 214 that a communication session cannot be established with the second device, then server 122 may prompt the user of mobile device 106 in block 216 to select an additional device to receive the specified electronic content. In such an embodiment, server 122 may await a request in block 204 that specifies the additional device.

However, if server 122 is able to establish a communications session with second device 112 in block 214, server 122 may translate the received request into an instruction that is appropriate to the second device in block 218. For example, the instruction may include the specified electronic content, and server 122 may deliver the instruction and the specified content to second device 112 in block 220. The specified electronic content may be delivered to second device 112 in an encrypted format (e.g., using IPsec), or in any other format apparent appropriate to the specified electronic content. After delivery in block 220, server 122 may transmit a confirmation of the delivery to first device 102 over network 130 in block 222.

Alternatively, in additional embodiments, the instruction may include an address of the specified electronic content, and server 112 may deliver the instruction and the address to second device 112, which may subsequently retrieve the specified electronic content. Additionally or alternatively, server 112 may transmit the translated instruction to an additional intermediate device (e.g., a data repository) to deliver the specified electronic content according to the received request.

Although described in terms of a first device and an unrelated second device, routine 200 is not limited to any specific number of unrelated devices interacting with server 122. For example, server 122 may establish communication sessions in block 202 with any additional or alternate number of devices supportable by network 130.

In the embodiments outlined above, a user of a device (e.g., first device 102), may interact with server 122 to request a delivery of electronic content to an unrelated device. In such embodiments, first device 102 may execute a widget, plug-in, or application program that enables the user of first device 102 to enter the request and transmit the request to server 122, as described below in reference to FIGS. 3A and 3B.

FIG. 3A illustrates an exemplary interface 300 that enables a user of first device 102 (e.g., a mobile telephone, smart phone, or video game controller) to schedule delivery of electronic content to an unrelated second device. Interface 500 may be generated by a widget, plug-in, or other application program associated with a server (e.g., server 122), or an additional service, including, but not limited to, a web-based television service or a video-on-demand service.

Interface 300 includes a region 302 that allows the user to select an element of electronic content from a specified set, and a region 304 that allows the user to enter, through an appropriate input device, a user-defined selection of electronic content. For example, in region 302, the user may select electronic content, such as a broadcast news program (e.g., "News"), a television program (e.g., "Cheers"), a movie (e.g., "Harry Potter"), or a video game (e.g., "Pac-Man"). In additional embodiments, interface 300 may facilitate the user's selection of any additional or alternate item of electronic content, available contemporaneously or at a future time.

Interface 300 may further include a region 306 that allows a user to select a second, unrelated device to receive the content delivered by server 122. For example, the devices associated with region 306 may be unrelated to first device 102, and may include, but are not limited to a set-top box (e.g., "My Set-Top Box"), a laptop computer (e.g., "My Laptop"), a digital video recorder (e.g., "My DVR"), and a video game console (e.g., "My Video Game Console"). Information associated with the devices listed in region 306 may be stored in device store 126B of server 122, as described above.

Interface 300 may also include a region 308 that enables entry of a user-defined selection of an alternate, unrelated device. For example, the user may enter into region 308, using an input device associated with first device 102, an identifier associated with any of the devices described above in reference to system 100.

Once the user has selected a device and an element of electronic content to be delivered to the device, the user may activate a "Deliver" icon 310 to deliver the selected electronic content to the selected device. The request may be transmitted to server 122 and server 122 may process the received request to identify the selected electronic content and the selected device (e.g., from content store 126A and device store 126B, respectively). Server 122 may further deliver an instruction corresponding to the selected content to the selected unrelated device, as outlined above in reference to routine 200.

As shown in FIG. 3A, the user may request delivery of the selected electronic content to the device immediately following activation of the "Deliver" icon. In additional embodiments, the interface may be configured to enable to user to specify a future time and date at which the selected electronic content will be delivered to the selected unrelated device, as described below in reference to FIG. 3B.

FIG. 3B illustrates an exemplary interface 320 that enables a user of a device (e.g., first device 102), to request delivery of electronic content to an unrelated device at a future time. As described above, interface 320 may be generated by a widget, plug-in, or other application program associated with a server, e.g., server 122, or an additional service, including, for example, a web-based television service or a video-on-demand service.

Similar to interface 300 of FIG. 3A, interface 320 includes a region 322 that allows the user to select an element of electronic content from a specified set of electronic content, a region 324 that allows entry of a user-defined selection of electronic content, and a region 306 that allows the user to select an unrelated device to receive the selected content. However, in contrast to the embodiment of FIG. 3A, interface 320 includes regions 326 and 338 that enable the user to specify, respectively, a date and corresponding time on which the selected content will be delivered to the selected device. For example, the user may select the broadcast television program "Cheers" as a content element from region 322, and may select that "Cheers" be delivered to the user's DVR in region 326. The user may also specify a date and a corresponding time at which the DVR may be schedule to record "Cheers."

The user may subsequently activate a "Deliver" icon 332 to deliver the selected electronic content to the selected device at the specified time and date. As outlined above in reference to FIG. 2, the request may be transmitted to server 122, and server 122 may process the received request to identify the selected electronic content and the selected device, and may deliver an instruction corresponding to the selected content the unrelated device at the specified date and time, e.g., using routine 200.

In the exemplary interface of FIG. 3B, the user may select a time and a date for delivery of selected electronic content to a device. However, interface 320 is not limited to such exemplary indicia of delivery and, in additional embodiments, interface 320 may incorporate any additional or alternate fields that allow the user to specify a future delivery of electronic content. Furthermore, although the user has selected "My DVR" within region 326, in additional embodiments, the user may have selected, within region 326, any additional or alternate unrelated device (e.g., the devices within region 306 of FIG. 3A), or may have specified any additional or alternate device (e.g., within region 308 of FIG. 3A) compatible with the components of system 100.

The embodiments outlined above in reference to FIGS. 2, 3A, and 3B allow a user of a first device (e.g., a smart phone, mobile telephone, video game controller, or any additional or alternate device described above) to coordinate delivery of electronic content to a second, unrelated device (e.g., a set-top box, a DVR, a video game console, a media player, or any additional unrelated device described above). In additional embodiments, the user of the first device may interact with server 122 to modify a state of an unrelated second device, as described below regarding FIG. 4.

Figure 4:
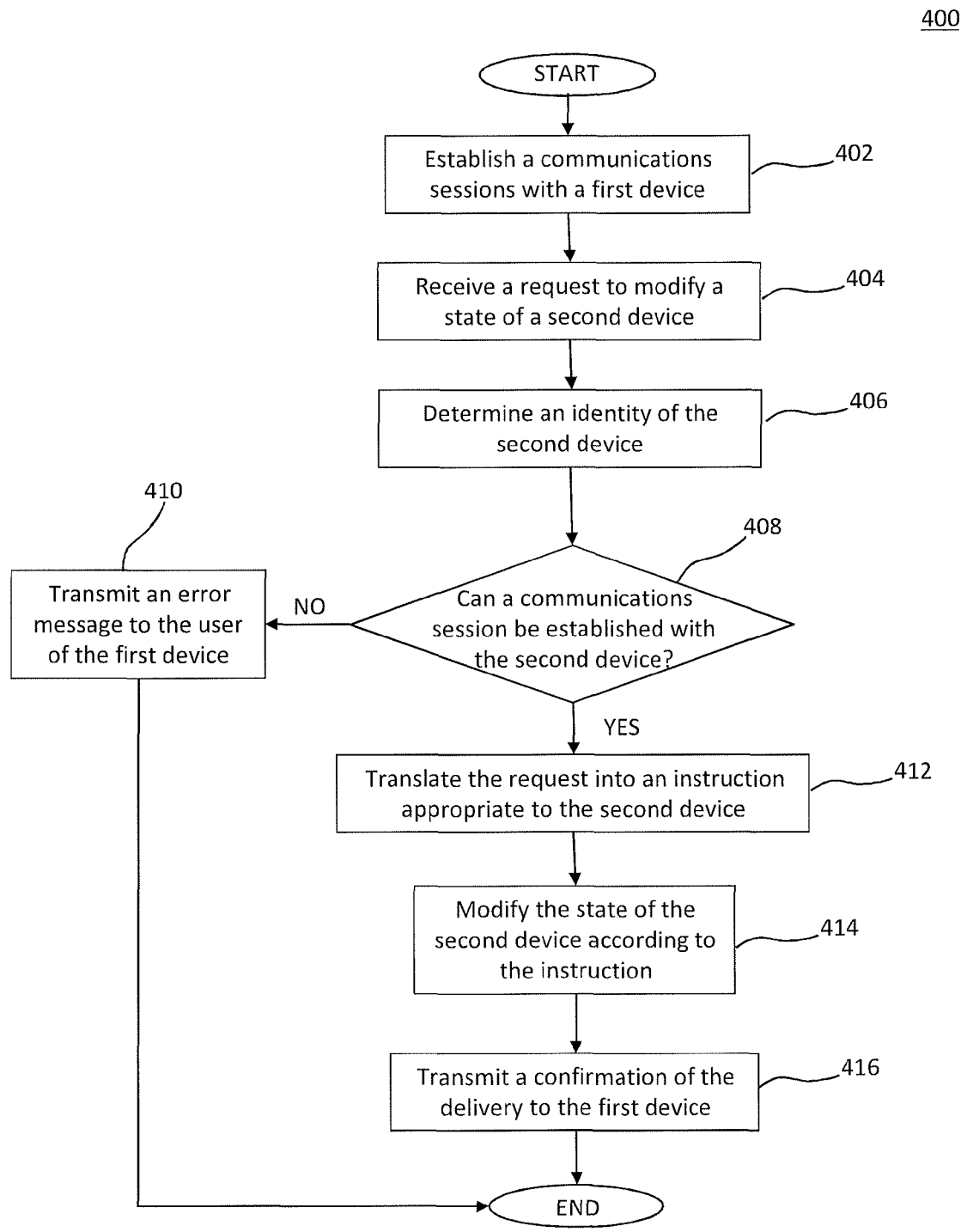
FIG. 4 is a flow diagram of an exemplary routine enabling a first device to modify an operational state of an unrelated device.

FIG. 4 is a flow diagram of an exemplary routine 400 that facilitates interaction between a server and multiple, unrelated devices, consistent with disclosed embodiments. As described above, system 100 provides functionality that enables a user of first device 102 (e.g., first device 102) to interact with a server (e.g., server 122) to modify an operational state of a second, unrelated device (e.g., second device 112). Routine 400 provides further details describing how first device 102 interacts with server 122 to modify an operational state of second device 102.

In block 402, server 122 may establish a communications session with first device 102. Server 122 may also obtain device-specific and connection-specific information associated with first device 102 in block 402. The device-specific and connection-specific information obtained by server 122 during block 402 may be stored in a database, e.g., device store 126B.

In block 404, server 122 may receive a request from first device 102 to modify an operational state of an unrelated second device (e.g., second device 112) in communication with network 130. For example, the unrelated device may include, but is not limited to, a home security system, one or more household appliances (e.g., a lighting system, a garage door opener, a coffee maker, or a dishwashing appliance), an electronic thermostat, a vehicular anti-theft system, an automatic ignition device for a vehicle, an electronic vending machine, a unrelated device similar to first device 102, and any additional or alternate device appropriate to the components of system 100.

The modification to the operational state may include, but is not limited to, an activation of second device 112, an activation of one or more functions of second device 112, a de-activation of second device 112, or a de-activation of one or more functions of second device 112. Furthermore, in such embodiments, the request may also include a time, a date, or a combination thereof associated with the modification to the operational state of second device 112.

In block 406, server 122 may determine an identity of second device 112. The identity of second device 112 may be retrieved from device store 126B. For example, the identity of second device 112 may have been previously designated by the user during a setup process. Alternatively, server 122 may request the identity of the second device 112 using other methods known in the art. Server 122 may then use the identity of the second device 112 to determine a set of appropriate instructions to modify the operational state of second device 112 in accordance with the request.

In block 408, server 122 may attempt to establish a communications session with second device 112 over network 130. If it is determined in block 408 that a communication session cannot be established with second device 112, then server 122 may transmit an error message to the user of first device 102 in block 410 across network 130. Furthermore, in an additional embodiment (not shown), server 122 may prompt the user to specify a modification to an additional, unrelated device, and may await a corresponding request in block 404 that specifies the modification.

However, if server 122 is able to establish a communications session with second device 112 in block 408, server 122 may translate the received request into an instruction appropriate to the second device in block 412, and may transmit the instruction to second device 112 in block 414 to modify the operational state of second device 112 in accordance with the request. After transmission of the instruction, server 122 may transmit a confirmation of the transmission to the user of first device 102 over network 130 in block 416.

In the embodiments outlined above, a user of a first device (e.g., first device 102), may interact with server 122 to request to modify an operational state of an unrelated, second device, e.g., second device 112. In such embodiments, first device 102 may execute a widget, plug-in, or application program that enables the user of first device 102 to enter the request and transmit the request to server 122, as described below regarding FIGS. 5A-5D.

FIGS. 5A and 5B illustrate exemplary interfaces that enable a user of a device (e.g., first device 102), to modify an operational state of an unrelated second device (e.g., a home security system, a household appliance, or an electronic thermostat) associated with a user. The exemplary interfaces of FIGS. 5A and 5B may be generated by a widget, plug-in, or other application program associated with a server (e.g., server 122) or an additional service, including, but not limited to, a provider of the home security system, the appliance, or the thermostat.

In FIG. 5A, an exemplary interface 500 includes a region 502 that allows the user to select a second, unrelated device from a specified set of devices, and a region 504 that allows the user to enter, through an appropriate input device, a user-defined selection of an unrelated device. For example, in region 502, the user may select, as the unrelated device, a home security system, a lighting system, a household appliance, such a device for opening a garage door, a DVR (e.g., "My DVR"), or a set top box (e.g., "My Set Top Box"). Interface 500 may also facilitate the user's selection of any additional or alternate unrelated device compatible with the components of network 130.

Interface 500 further includes a region 506 that allows the user to select a particular change in the operational state of the unrelated device specified by the user in one of regions 502 and 504. For example, in region 506, the user may choose to "activate" the unrelated device, or alternatively, to "de-activate" the unrelated device. However, interface 500 is not limited to such exemplary changes of operational state, and in additional embodiments (not shown), the user may select in region 506 to activate one or more particular functions of the unrelated device or, alternatively, to deactivate one or more particular functions of the selected device.

Interface 500 may also include a region 508 that enables the user to specify that the requested change in state affects the unrelated device immediately. Alternatively, the user may enter within region 510 a specific time in the future at which the selected change in state will be effective.

Once the user has selected the unrelated device, the change in state, and the effective time, the user may activate a "Deliver" icon 512 to transmit the request to server 122. As described above in reference to FIG. 4, server 122 may identify the selected device, the selected change in state, and the effective time from the request, and may generate a corresponding instruction to the unrelated device that modifies the state of the unrelated device in accordance with the request.

FIG. 5B illustrates an exemplary interface 520 that enables a user of a device (e.g., first device 102), to modify an operational state of an electronic thermostat associated with a heating and cooling apparatus of the user's home, office, or other space. In such an embodiment, interface 520 may include a region 522 that enables to user to select the electronic thermostat as the unrelated device, and a region 524 that enables the user to select a state change appropriate to the electronic thermostat.

For example, in region 524, the user may select to change an operational setting of the electronic thermostat to heat the space (i.e., by selecting "Heat"), or alternatively, to cool the space (i.e., by selecting "Cool"). Further, the user may activate a fan associated with the heating and cooling apparatus (i.e., by selecting "Fan"), or the user may alternatively deactivate the heating and cooling apparatus by turning off the thermostat (i.e., by selecting "Off").

Depending on the selected change in operational mode, interface 520 may also include region 526 that enables a user to enter a threshold temperature using an input device associated with first device 102. For example, the threshold temperature represents a temperature at which the heating and cooling apparatus maintains the home when the electronic thermostat is in either "heat" or "cool" mode.

Once the user has selected the electronic thermostat, specified the desired state change, and entered the threshold temperature, the user may activate a "Deliver" icon 512 to transmit the request to server 122. As described above in reference to FIG. 6, server 122 may identify the selected state change and the threshold temperature from the request, and may generate a corresponding instruction to modify the state of the electronic thermostat in accordance with the request.

FIG. 5C illustrates an exemplary interface 540 that enables a user of a first device 102 to modify an operational state of an unrelated second device associated with a vehicle of the user, e.g., an anti-theft system or an automatic ignition system. As discussed above, exemplary interface 540 may be generated by a widget, plug-in, or other application program associated with server 122, or an additional service, including, but not limited to, a provider of the anti-theft system or the automatic ignition system.

In FIG. 5C, interface 540 includes a region 542 that allows the user to select a second, unrelated device from a specified set of devices, and a region 544 that allows the user to enter, through an appropriate input device, a user-defined selection of an unrelated device. For example, in region 542, the user may select, as the unrelated device, a vehicle anti-theft system or an automatic ignition system.

Interface 540 further includes a region 546 that allows the user to select a change in the operation state of the unrelated device selected by the user in one of regions 542 and 544. For example, in region 546, the user may choose to "activate" the unrelated device, or alternatively, to "de-activate" the unrelated device. However, interface 500 is not limited to such exemplary changes of operation state, and in additional embodiments (not shown), the user may select in region 546 to activate one or more particular functions of the unrelated device, or alternatively, to deactivate one or more particular functions of the unrelated device.

Interface 540 may also include a region 548 that enables the user to specify that the requested change in state affects the unrelated device immediately. Alternatively, the user may enter within region 550 a specific time in the future at which the selected change in state will be effective.

The user may subsequently activate a "Deliver" icon 552 to transmit the request to server 122. As described above in reference to FIG. 4, server 122 may identify the selected device, the selected change in state, and the effective time from the request, and may generate a corresponding instruction to modify the state of the unrelated device in accordance with the request.

In another embodiment, interfaces may enable a user to purchase items from a vending machine, as described below in reference to FIG. 5D. For example, vending machines may include, but are not limited to, snack machines, soda machines, DVD rental stations, or any additional or alternate vending machine.

FIG. 5D illustrates an exemplary interface 560 that enables a user of first device 102 to purchase an item from an electronic vending machine. As discussed above, exemplary interface 560 may be generated by a widget, plug-in, or other application program executed by first device 102 and associated with a server (e.g., server 122), or an additional service, including, but not limited to, a provider of the vending machine.

Interface 560 may include a region 562 that enables to user to select one of a number of vending machines available to the user. First device 102 may be associated with a geo-spatial positioning system (e.g., a GPS system) that identifies a location of first device 102, and the widget, plug-in, or application executing on first device 102 may leverage the location to present one or more vending machines in region 562 that are proximate to the user's location. For example, interface 560 may identify that the user is near a snack vending machine and a DVD vending machine, and may enable to user to select one of the identified machines in region 562.

After selection of a vending machine in region 562 (e.g., the snack vending machine), interface 560 may display one more items available for purchase from the selected vending machine within region 564. For example, in FIG. 5D, region 564 indicates that "soda," "juice," "chips," and "pretzels" are available for purchase from the snack vending machine identified in region 562. The user may select one or more of the items identified within region 564 for purchase.

Once the user has selected one or more items for purchase, the user may activate a "Deliver" icon 512 to transmit the request for the items to server 122. As described above in reference to FIG. 4, server 122 may extract identifiers of the selected vending machine and the item from the request, and may execute the purchase from the vending machine in accordance with the received request. In such embodiments, widget, plug-in, or application executing on mobile device 106 may be associated with a financial account of the user (e.g., a checking account of the user or a credit card of the user), and server 122 may interface with the selected vending machine to complete the transaction using the financial account of the user.

Figure 6:
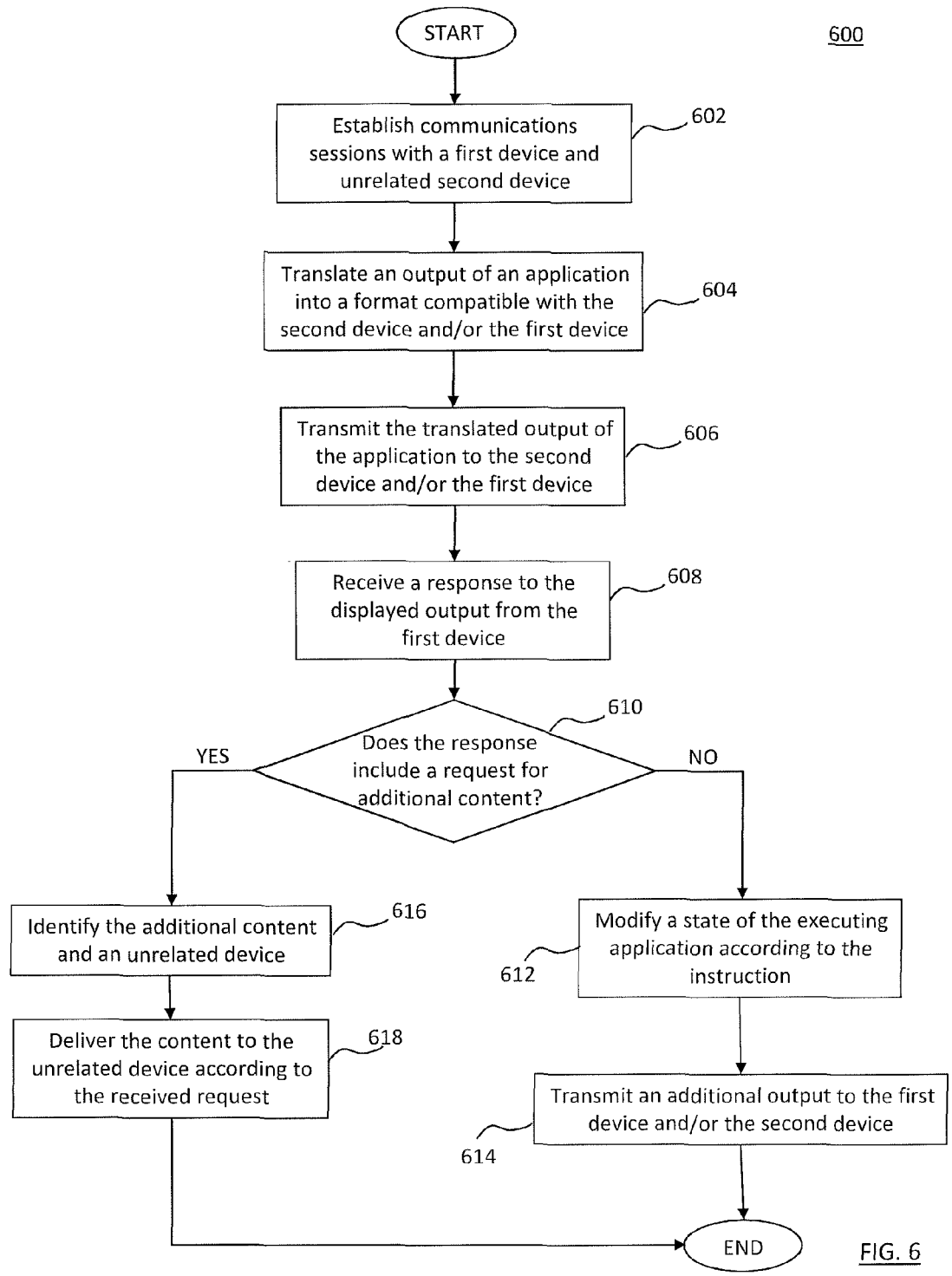
FIG. 6 is a flow diagram of an exemplary routine facilitating interaction between a server and unrelated devices.

FIG. 6 is a flow diagram of an exemplary routine 600 that facilitates interactions between multiple, unrelated devices and a server, consistent with disclosed embodiments. As described above, system 100 provides functionality that enables a user associated with a first device (e.g., first device 102) to interact with or control content presented by a second device (e.g., second device 112), and to interact with multiple users of similar unrelated first and second devices. Routine 600 provides further details describing how a user of first device 102 interacts with and controls content displayed by unrelated second device 112, and interacts with multiple, geographically dispersed users.

Although described in terms of a single control device and a single display device, exemplary routine 600 is not limited to a specific number of devices interacting with server 122. In additional embodiments, server 122 may establish communication sessions with any additional or alternate number of devices supportable by network 130 and associated with multiple users within system 100.

In block 602, server 122 may establish a communications session with first device 102 (e.g., a smart phone, a mobile phone, a video-game controller, etc.), and may establish a communications sessions with second device 112 (e.g., a set top box, a DVR, and a web-enabled DVD player, etc.). Second device 112 may be in communication with a display device (e.g., a high-definition television, an LCD television, a plasma television, or a three-dimensional television).

First device 102 and a display device associated with second device 112 may present electronic content to the user. For example, the electronic content may include broadcast television programs, DVD programs, additional content associated with a video-on-demand service, a web-based television application, or any additional or alternate content compatible with the components of system 100.

In block 604, server 122 may translate an output of an application executing on server 122 into a format compatible with second device 112, and server 122 may transmit the translated output of the application to second device 112 in block 606. For example, the translated output of the executed application may include a video stream, an audio stream, one or more discrete video files or audio files, one or more digital images, and a string of characters. Furthermore, for example, second device 112 may receive the output, render, in conjunction with the display device, the received output for presentation, and subsequently present the rendered output to one or more viewers. The output may be presented to the user concurrently with the content presented to the user by the display device. For example, the transmitted output may overlap a portion of the presented content, or may be presented to the user within a window proximate to the displayed content.

In an additional embodiment, in block 604, server 122 may also translate the output into a format compatible with first device 102, and may deliver the translated output to first device 102 in block 606 substantially in parallel with the transmission of the output to second device 112. First device 102 may receive the output from server 122, render the received output for presentation, and present the rendered output to the user of first device 102. For example, the output presented by first device 102 may include information similar to the output transmitted to second device 112, and as described above, the transmitted output may be presented concurrently with electronic content presented to the user by first device 102.

The application may correspond to an application program or set of program instructions accessible to server 122 (e.g., stored within content store 126A). As described above, the application may include an electronic game (e.g., video or arcade games), a file sharing application (e.g., application facilitating the distribution of personal photos and images), a social networking or micro-blogging application (e.g., Facebook or Twitter), and any additional or alternate application program.

In an additional embodiment, the application may include an interactive gaming application that allows multiple, geographically-dispersed users of unrelated devices within system 100 to interact with each other in response to the displayed content (e.g., content displayed on a display device in communication with second device 112). For example, server 122 may transmit a question associated with the presented content to one or more of first device 102 and second device 112 in bock 604, and to similar devices associated with multiple users within system 100, to enable interaction between users viewing a common element of electronic content (e.g., a television program or a movie).

Figure 3:
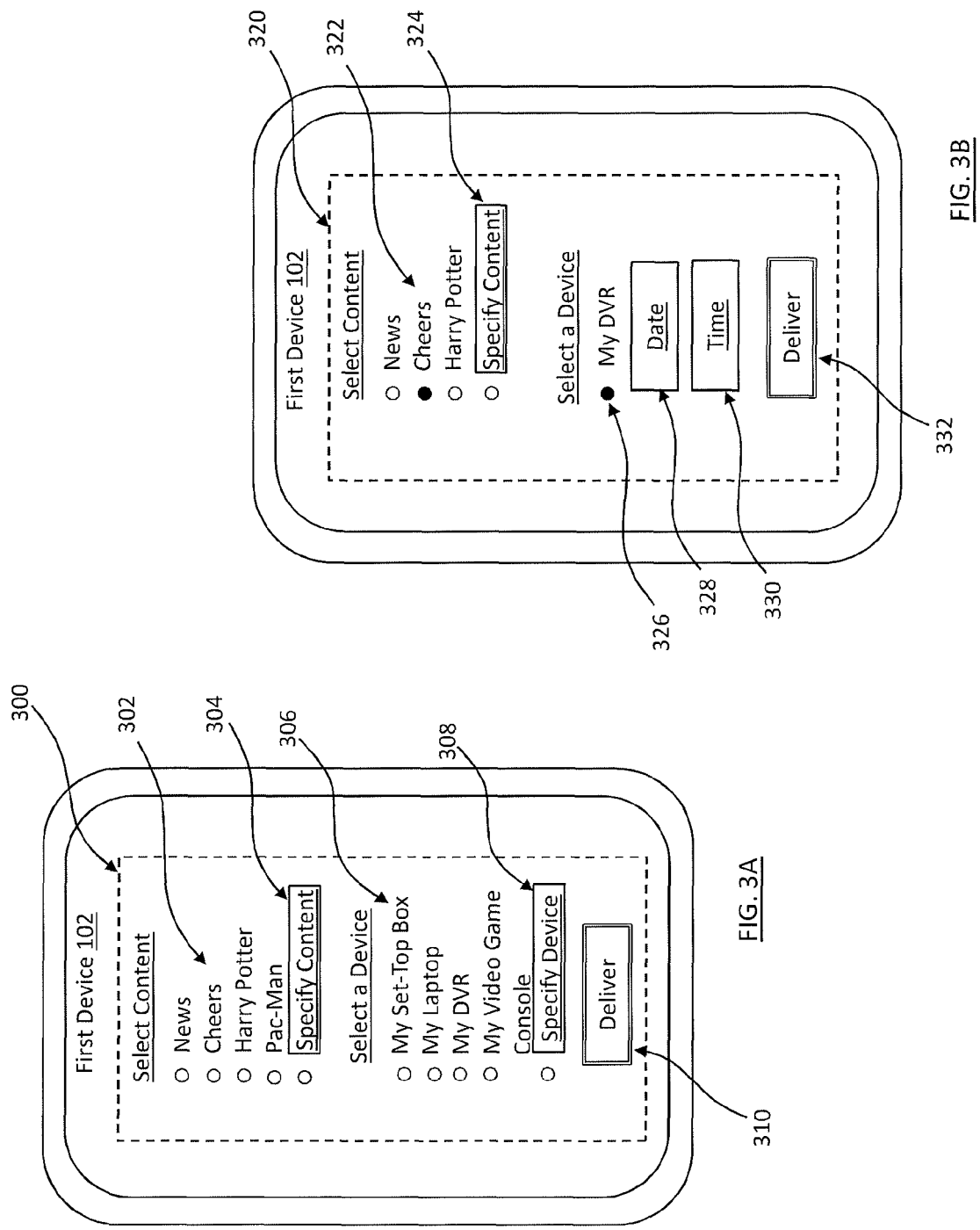
FIGS. 3A and 3B illustrate exemplary user interfaces.

In additional embodiments, the output transmitted to first device 102 may prompt the user of first device 112 to select an item of the electronic content, and to deliver additional electronic content associated with the selection to an unrelated device (e.g., using an interface similar to interface 300 of FIG. 3). For example, a user may "tag" electronic content and deliver additional electronic content associated with the tagged content to an unrelated device.

Referring back to FIG. 6, in block 608, server 122 may receive a response to the transmitted output from first device 102. For example, the response may include an instruction to modify a state of the application executing on server 122, an answer to the output of the interactive question posed to the user, or a selection of the content presented to the user (e.g., "tagged" content). The instruction may include data generated based on a user command received through an interface of first device 102, including, for example, a string of characters entered into first device 102 using a keyboard or touchscreen interface, a selection of an icon displayed on first device 102 using a mouse, touchpad, or other appropriate interface, a gestural input associated with a movement of a mouse, a movement associated with a touchpad, or a movement associated with any other appropriate interface.

In block 610, server 122 may determine whether the response to the transmitted output corresponds to a request for additional content associated with a selection of content to the user of first device 112 content. If it is determined in block 610 that the response does not correspond to a request for additional content, then server 122 may modify a state of the application executing on server 122 according to the received response in block 612 (e.g., as described above in reference to FIG. 4).

The modification may reflect a desired motion of a character or avatar in an electronic game, a selection of electronic content displayed in a file sharing application, or any additional or alternate modification to an application state appropriate to the application. In an additional implementation, the modification in block 610 may include a collection of responses from multiple users to the output of an interactive question, a determination of a correct response, and an identification of those users submitting the correct response.

In response to the modification, server 122 may generate additional output, including, for example, an audio stream, one or more discrete video files or audio files, one or more digital images, and a string of characters. In block 614, server 122 may transmit the additional output to one or more of first device 102 and second device 112, and to similar unrelated devices associated with multiple users within system 100. In such embodiments, first device 102 and second device 112, and the additional unrelated devices, may present the additional output to one or more viewers.

However, if it is determined in block 610 that the response to the transmitted output includes a request to deliver additional content to an unrelated device, server 122 may identify the additional content related and the unrelated device in block 616. Server 122 may extract an identifier associated with selected electronic content included within the request, and retrieve additional content associated with the selection, for example, from content store 126A or from additional data repositories included within system 100. The additional content may include digital video files, digital audio files, digital images, text-based documents, advertisements, or any additional or alternate content appropriate to the components of system 100.

In block 616, server 122 may also extract an identifier associated with the unrelated device, and obtain device-related information, including a physical network address of the unrelated device, from device store 126B. In block 618, the retrieved additional content may be transmitted across network 130 to the unrelated device associated with the received request.

In the embodiments of FIG. 6, a user may interact with a server across network 130 using multiple, unrelated devices (e.g., first device 102 and second device 112). As such, and in contrast to conventional PC-based systems, system 100 may represent a "virtual personal computer" that allows the user to leverage the functionality of network-based, or "cloud-based," resources using a control device and a display device selected by the user.

For example, the disclosed embodiments may enable a user of a device (e.g., first device 102), to "tag" electronic content and deliver additional electronic associated with the tagged content to unrelated second device 102. As discussed above, output transmitted to first device 102 in block 606 may prompt the user of first device 102 to select an item of the electronic content, and to deliver additional electronic content associated with the selection to an unrelated device, as disclosed below regarding FIGS. 7A and 7B.

Figure 7B:
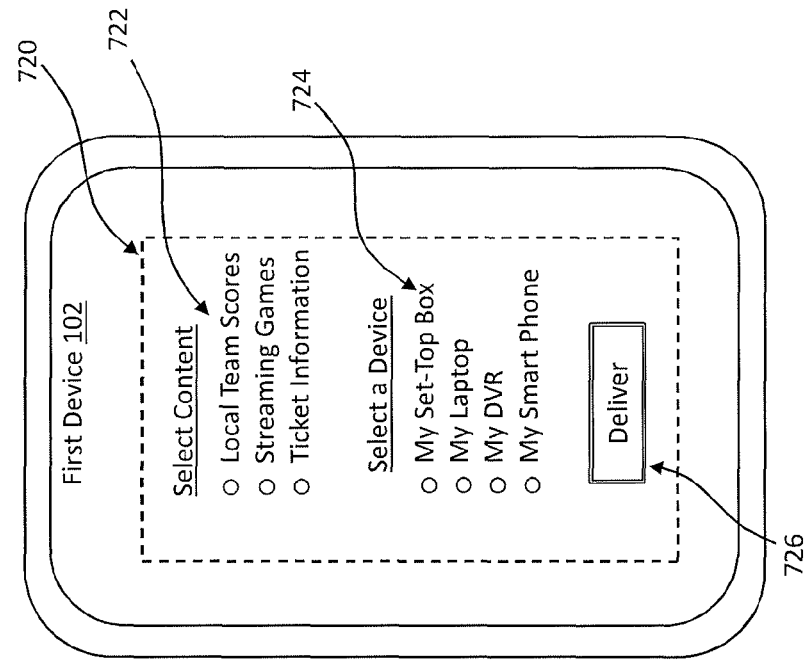
FIGS. 7A and 7B exemplary user interfaces that facilitate the tagging of content using multiple devices.
Figure 7A:
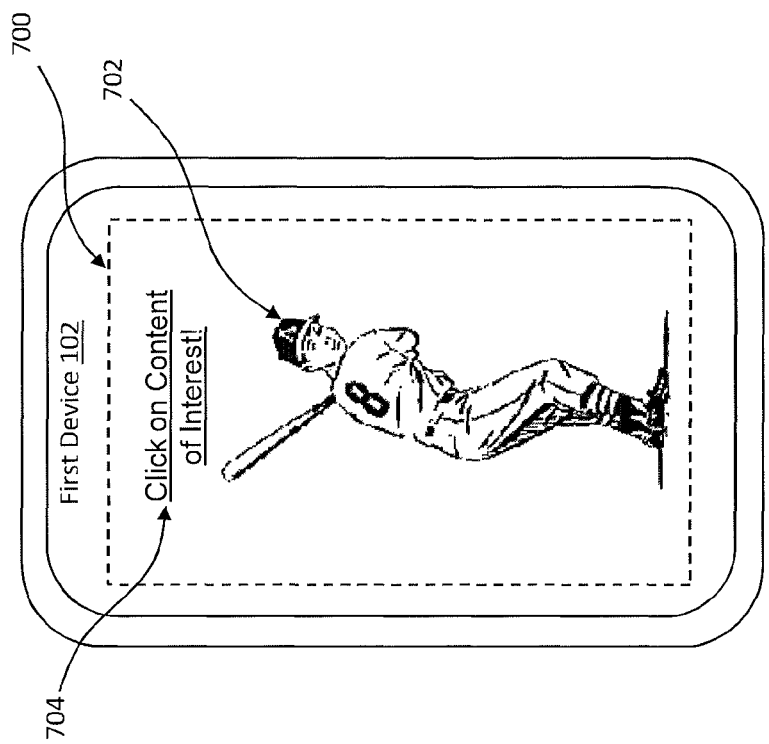

FIG. 7A illustrate an exemplary interface 700 that enables a user of first device 102 to tag a selection of displayed electronic, according to disclosed embodiments. Interface 700 may be generated by a widget, plug-in, or other application program associated with a server (e.g., server 122) or an additional service, including, but not limited to, a web-based television service or and a video-on-demand service.

Interface 700 displays to the user an element 702 of electronic content. Element 702 may represent a portion of a video stream transmitted to first device 102 from, for example, web-based television service or a video-on-demand service, a digital image within a file sharing application or any additional or alternate content.

For example, in FIG. 7A, the user of first device 102 may be viewing a baseball game involving a local team, and element 702 may a batter of the team approaching the plate. Although the example of a baseball game is discussed in connection with FIG. 7A, in other embodiments, element 702 may include additional or alternate content displayable to the user by first device 102.

Interface 700 may enable the user to select content element 702 (e.g., the batter) using, for example, an input device of first device 102. In such embodiments, server 122 may transmit data regarding one or more elements of content displayed to the user, and the widget, plug-in, or other application program may leverage this information to enable to user to select an element of displayed content and obtain additional information associated with the selected content element from server 122.

Interface 700 may display an output that prompts the user in region 704 to "Click on Content of Interest." The user of the first device 102 may select the content of interest (e.g., the batter associated with content element 702), by clicking or otherwise selecting the content using a touch-screen interface or a roller-ball interface, according to a string of characters entered into first device 102 using a keyboard or touch-screen interface, and or using any additional or alternate means appropriate to first device 102.

Once element 702 is selected by the user, first device 102 may transmit the selected content element to server 122 as a request for additional content. After receipt of the request, server 122 may extract an identifier associated with selected content and may identify one or more elements of additional electronic content associated with the selection. For example, the additional content elements may be extracted from content store 126B of server 122, or may be obtained from one or more data repositories in communication with server 122 across network 130.

After identification of the additional content elements, server 122 may transmit identifiers associated with the additional content to first device 102, and the widget, plug-in, or other application may enable the user to select one or more of the identified content for delivery to an unrelated device using interface 720 of FIG. 7B.

In FIG. 7B, interface 720 includes a region 722 that allows the user to select elements of additional electronic content from a specified set of electronic content. For example, in region 722, the user may select, as electronic content associated with selected content 702, scores associated with the local team (e.g., "Local Scores"), streaming video associated with the selected content (e.g., "Streaming Games"), and information regarding tickets associated with sporting events associated with the selected content (e.g., "Ticket Information"). In additional embodiments, interface 720 may facilitate the user's selection of any additional or alternate item of electronic content, available contemporaneously or at a future time.

Interface 720 may include a region 724 that allows a user to select a second, unrelated device to which the selected content is delivered by server 122. The devices associated with region 724 may be unrelated to first device 102, and may include, but are not limited to a set-top box (e.g., "My Set-Top Box"), a laptop computer (e.g., "My Laptop"), a digital video recorder (e.g., "My DVR"), and a smart phone (e.g., "My Smart Phone"). Information associated with the devices listed in region 724 may be stored in device store 126B of server 122, as described above.

Although not depicted in FIG. 7B, interface 720 may also include a region that enables entry of a user-defined selection of additional content, and a region that enables entry of a user-defined selection of an alternate, unrelated device. For example, the user may enter into such regions, using an input device associated with first device 102, an identifier associated with additional elements of electronic content, or an identifier associated with any of the devices described above.

Once the user has selected an unrelated device and an element of electronic content to be delivered to the unrelated device, the user may activate a "Deliver" icon 726 to deliver the selected electronic content to the selected device. In such an embodiment, the request may be transmitted to server 122. Server 122 may process the received request to identify the selected electronic content and the selected device (e.g., from content store 126A and device store 126B, respectively), and may deliver an instruction corresponding to the selected content to the selected unrelated device, as outlined above.

Routine 600 of FIG. 6 may also enable one or more geographically-dispersed users to interact with server 122 over network 130 to participate in an electronic gaming application (e.g., a PC-based video game or an interactive quiz game) using corresponding, unrelated control and display devices. For example, each of the one or more geographically-dispersed users may be associated with corresponding, unrelated control and display devices that enable the users to view audio-visual content and to interact with each other through an interactive quiz game, as described below in FIGS. 8 and 9A-9C.

Figure 8:
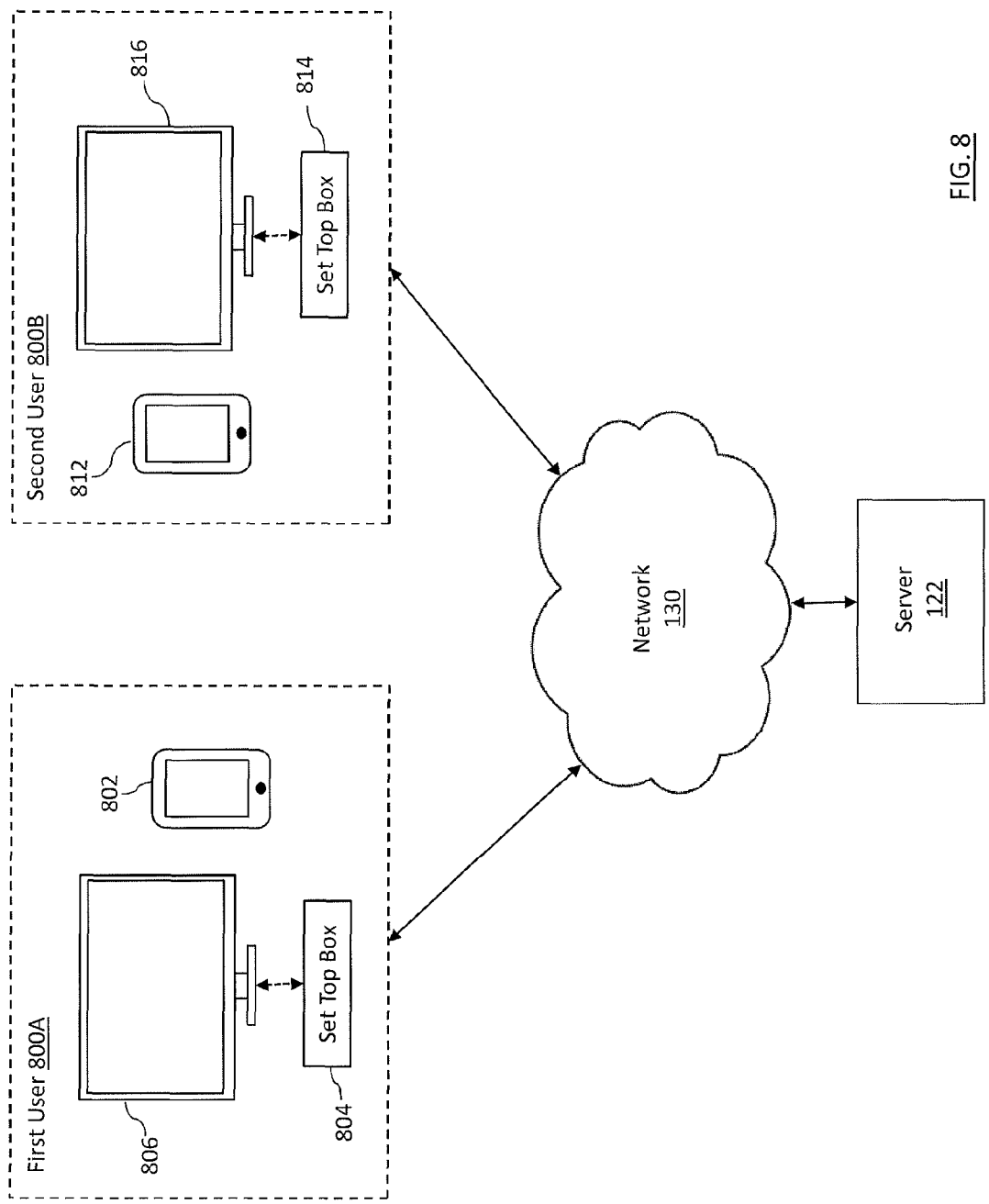
FIG. 8 illustrates an exemplary configuration of a system including multiple, geographically-dispersed users.

FIG. 8 illustrates an exemplary configuration of system 100 that includes unrelated control and display devices of geographically-dispersed users in communication with server 122 across network 130, consistent with disclosed embodiments. In FIG. 8, a first user 800A may be associated with a control device 802, a set top box 804, and a display device 806 in communication with set top box 804. A second user 800B may be associated with a control device 812, a set top box 814, and a display device 816 in communication with set top box 814. First user 800A may be associated with a geographic location different from a geographic location of second user 800B. For example, the first user 800A and second user 800B may be position in different rooms of a dormitory, or first user 800A may be located, for example, in Wash., D.C., while second user 800B may be located, for example, in Seattle, Wash. Accordingly, electronic content (e.g., streaming video, digital images, audio, etc.) may be presented to first user 800A and second user through corresponding set-top boxes and display devices, and first user 800A may interact with second user 800B across network 130 using an interactive quiz game associated with the streaming video and coordinated by server 122.

As discussed above, control device 802 may be unrelated to set top box 804 and display device 806, and control device 812 may be unrelated to set top box 814 and display device 816. For example, control devices 802 and 812 may include one or more of a mobile telephone, a smart phone, an voice-over-IP (VOIP) telephone, a personal digital assistance having wireless communication capability, a video game controller, a tablet personal computer (PC), a notebook computer, a laptop computer, or any additional or alternate device operable to transmit and receive data across network 130.

As discussed above, display devices 806 and 816 may include, respectively, a high-definition television, a LCD television, a plasma television, a projection display, or any additional or alternate display device apparent to one of skill in the art and capable of communication with corresponding set top boxes 804 and 814. Although described in terms of set top boxes, devices 804 and 814 are not limited to such exemplary devices, and in additional embodiments, devices 804 and 814 may include web-enables DVD or Blu-ray players, DVRs, or any additional or alternate devices enabled to communicate with server 122 over network 130.

FIGS. 9A, 9B, and 9C depict exemplary content associated with an interactive quiz game executed by server 122, according to disclosed embodiments. As outlined above, first user 800A may be viewing audio-visual content presented by display device 806 in communication with set-top box 804, and second user 800B may be viewing audio-visual content presented by display device 816 in communication with set-top box 814.

At a pre-determined time during the presentation of the audio content, or in response to a triggering event (e.g., a request to initiate the application from one or more of first user 800A and second user 800B), server 122 may transmit an output of the interactive quiz game to set-top boxes 804 and 814, and display devices 806 and 806 may present the received output to first user 800A and second user 800B.

FIG. 9A illustrates an exemplary output 900 of an interactive quiz game transmitted from server 122 to set-top boxes 804 and 814, and presented to the first user 800A and second user 800B by display devices 806 and 816. In FIG. 9A, output 900 presented to first user 800A and second user 800B includes a question 902 associated with an element of the audio-visual content the first user. For example, question 902 may ask first user 800A and second user 800B, "What is the hometown of the main character?" In additional embodiments, question 902 may include any additional or alternate question associated with the presented audio-visual content.

Substantially in parallel with the transmission of output 900 to set top boxes 804 and 814, server 122 may also transmit a similar output to control devices 802 and 812. FIG. 9B illustrates an exemplary output 920 that may be transmitted to control devices 802 and 812.

In FIG. 9B, output 920 may present question 902 to a user (e.g., first user 800A and second user 800B), and may further present an input region 904 that allows the user to enter an answer to question 902. The user may enter a response to question 902 within region 924 using interfaces associated with control devices 802 and 804, including, but not limited to a keyboard, mouse, touch pad or touch screen, microphone, video camera, or any additional or alternate interface appropriate to control devices 802 and 804.

Once first user 800A and second user 800B enter the answer to question 902 within region 824 of their respective control devices, the control devices may transmit the submitted answers to server 122 as an instruction. Furthermore, control devices 802 and 812 may also incorporate into the instructions an identifier of the corresponding control device (e.g., a device name, a serial number of the device, or a manufacturer of the device) and/or an identifier of the corresponding user (e.g., a user name of first user 800A or second user 800B).

Server 122 may receive the instructions from control device 802 of first user 800A, from control device 812 of second user 800B, and from control devices associated with others of the multiple viewers (e.g., within block 606 of FIG. 6). Server 122 may process the received instructions to extract the answers associated with the questions, and may subsequently determine whether any of the extracted answers match a correct answer, and additionally or alternatively, any portion of the correct answer deemed to be a correct answer (e.g., within block 610 of FIG. 6). Server 122 may subsequently transmit an output associated with the correct answer to question 902 to set-top boxes 804 and 814, and additionally or alternatively, to the control devices 802 and 812 (e.g., within block 612 of FIG. 6).

FIG. 9C illustrates an exemplary output 940 associated with a correct answer that is transmitted from server 122 to set top boxes 804 and 814, and displayed to first user 800A and second user 800B by corresponding display devices 806 and 816. In FIG. 9C, output 940 includes a correct answer 946 and information 948 identifying those users associated with correct answers. For example, correct answer 906 is "Wash., D.C.," and information 948 lists "User #1" as submitting the correct answer.

In the implementation discussed above regarding FIGS. 8 and 9A-9C, a display device (e.g., display device 806) is in communication with a set top box (e.g., set top box 804) and displays content received and rendered by the set top box. In additional embodiments, the display device may include functionality to establish a connection with a module of server 122 configured to transmit media content (e.g., Flash media) across network 130. Once such a connection is established and periodically synchronized, the display device may receive output transmitted from server 122, render that output into a format for presentation, and present the rendered output to one or more viewers, without any intermediate set-top box, DVR, or web-enabled DVD or Blu-ray player.

In the embodiments described above, server 122 receives and executes functions (e.g., delivering content and modifying device states) in response to instruction received from, for example, unrelated first device 102 and second device 112. In additional embodiments, such functions may be executed by server 122 absent any specific instruction from first device 102 and second device 112. For example, server 122 may perform these functions in response to a particular triggering event, e.g., in response to a particular action of the user, in response to a particular time stamp, or in response to any additional or alternate event or user action.

Furthermore, in the exemplary routines of FIGS. 2, 4, and 6, first device 102 and second device 112 may transmit an instruction to server 122 that includes, for example, a string of characters entered into mobile device 106 using a keyboard or touch-screen interface, and a selection of an icon displayed on mobile device 106 using a mouse, touchpad, or other appropriate interface. However, the instructions are not limited to such exemplary data, and in additional embodiments, the instructions transmitted from first device 102 and second device 112 to server 122 may include a physical gesture of the user of mobile device 106.

In such an embodiment, server 122 may receive the instruction that includes the physical gesture of the user, and may detect the gesture of the user from the instruction. For example, the control instruction may incorporate a digital image that includes the gesture, and server 122 may extract the gesture from the digital image using one or more digital image processing techniques.

Once the gesture of the user has been detected from the control instruction, server 122 may correlate the detected gesture with an intended action (e.g., a delivery of content or a modification of a state of a device). The correlation may be based on a comparison between the detected gesture and a database or repository of stored gestures and modifications associated with the stored gestures (e.g., stored in memory 126 of server 122). For example, the server may process the received instruction to identify a "sweeping" motion of the user's hand, and may correlate the "sweeping" motion with an intended modification of a state of a device. Such intended modifications may include, but are not limited to, activating or deactivating a device, selecting or browsing electronic content displayed in a file management application, modifying a volume at which an output of an application program is presented by the device, or any additional or alternate modification or action.

As one of ordinary skill in the art will appreciate, one or more of blocks 202-222, 402-416, and 602-618 may be optional and may be omitted from implementations in certain embodiments. Furthermore, functionality provided by one or more of blocks 202-222, 402-416, and 602-618 may be subdivided into multiple blocks.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other high-definition optical storage media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C#, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting additional blocks or deleting blocks. It is intended, therefore, that the specification and examples be considered as exemplary only, with a true scope and spirit being indicated by the following claims and their full scope of equivalents.

What is claimed is:

1. A computer-implemented method for controlling unrelated devices, comprising:
   establishing a communications session between a networked server and a control device of a user;
   establishing a communications session between the networked server and a controlled device, the controlled device being unrelated to the control device;
   transmitting, to the control device, a video content item and data regarding a plurality of content elements within the video content item;
   receiving, at the networked server, a selection of a selected content element of the plurality of content elements within the video content item, wherein the selected content element is selected during presentation of the video content item at the control device;
   identifying one or more additional content items related to the selected content element;
   transmitting, to the control device, data regarding the one or more additional content items related to the selected content element;
   subsequent to transmitting the data regarding the one or more additional content items related to the selected content element, receiving, at the networked server, an instruction from the control device, the instruction regarding an additional content item of the one or more additional content items;
   determining, at the networked server, a corresponding instruction understood by the controlled device, the corresponding instruction being operable to cause the controlled device to obtain the additional content item at a time or date consistent with the corresponding instruction; and
   transmitting the corresponding instruction to the controlled device.

2. The computer-implemented method of claim 1, wherein:
   the instruction from the control device comprises a request to retrieve the additional content item, the additional content item being associated with an identifier; and
   the corresponding instruction is operable to cause the controlled device to retrieve the additional content item based on at least the identifier.

3. The computer-implemented method of claim 1, wherein the controlled device is a first controlled device, and the corresponding instruction is sent to the first controlled device and a second controlled device.

4. The computer-implemented method of claim 1, wherein the control device of the user is a first control device, and the first control device and a second control device are enabled to control the controlled device.

5. The computer-implemented method of claim 1, wherein:
the instruction from the control device comprises a request to display or store the additional content item; and
the corresponding instruction is operable to cause the controlled device to display or store the additional content item.

6. The computer-implemented method of claim 1, wherein:
the instruction from the control device comprises a request to modify an operational state of the controlled device; and
the corresponding instruction is operable to cause the controlled device to modify the operational state.

7. The computer-implemented method of claim 1, further comprising:
detecting a gesture of the user based on the instruction from the control device; and
correlating the detected gesture with a modification to the state of the controlled device.

8. A computer-implemented method, comprising:
transmitting, to a control device of a user, a video content item and data regarding one or more content elements within the video content item;
receiving, at a networked server, a selection of a first content element of the one or more content elements within the video content item, wherein the first content element is selected during presentation of the video content item at the control device;
transmitting, to the control device, data regarding one or more additional content items associated with the first content element;
subsequent to transmitting the data regarding the one or more additional content items associated with the selected content element, receiving, at the networked server, an instruction from the control device, the instruction regarding obtaining, by a controlled device, an additional content item of the one or more additional content items, wherein the control device is unrelated to the controlled device;
generating, at the networked server, a corresponding instruction understood by the controlled device, the corresponding instruction being operable to cause the controlled device to obtain the additional content item at a time or date consistent with the corresponding instruction; and
transmitting the corresponding instruction to the controlled device.

9. The computer-implemented method of claim 8, further comprising:
establishing a communications session between the networked server and the control device; and
establishing a communications session between the networked server and the controlled device.

10. The computer-implemented method of claim 8, wherein:
the instruction from the control device comprises a request to retrieve the additional content item, the additional content item being associated with an identifier; and
the corresponding instruction is operable to cause the controlled device to retrieve the additional content item based on at least the identifier.

11. The computer-implemented method of claim 10, wherein the request to retrieve the additional content item comprises a retrieval time or a retrieval date.

12. The computer-implemented method of claim 10, further comprising:
determining a storage location associated with the additional content item based on at least the identifier,
wherein the corresponding instruction is operable to cause the controlled device to receive the additional content item from the determined storage location.

13. The computer-implemented method of claim 8, wherein:
the instruction from the control device comprises a request to display or store the additional content item; and
the corresponding instruction is operable to cause the controlled device to display or store the additional content item.

14. The computer-implemented method of claim 8, wherein:
the corresponding instruction is operable to cause the controlled device to modify an operational state.

15. The computer-implemented method of claim 14, wherein the corresponding instruction comprises a request to activate the controlled device or deactivate the controlled device.

16. The computer-implemented method of claim 14, wherein the corresponding instruction comprises a request to activate or deactivate a functionality of the controlled device.

17. The computer-implemented method of claim 14, wherein the corresponding instruction comprises one or more operational parameters of the controlled device.

18. The computer-implemented method of claim 8, further comprising:
detecting a gesture of the user based on the instruction from the control device; and
correlating the detected gesture with a modification to an operational state of the controlled device.

19. The computer-implemented method of claim 8, further comprising:
processing the first content element to identify the one or more additional content items related the first content element;
retrieving, from a storage device, the one or more additional content items;
transmitting the one or more additional content items to the control device, wherein the control device is configured to present the one or more additional content items to a user; and
receiving, from the control device, a selection of the additional content item.

20. The computer-implemented method of claim 8, wherein the instruction received from the control device comprises data generated based on at least a user command received through an interface of the control device.

21. The computer-implemented method of claim 8, wherein the instruction received from the control device further comprises at least one of a character string or a gestural input.

22. An apparatus, comprising:
a processor for executing program instructions; and
a memory storing the program instructions, the program instructions being executed by the processor to perform a process to:
transmit, to a control device, a video content item and data regarding one or more content elements within the video content item;
receive, from the control device, a selection of a first content element of the one or more content elements within the video content item, wherein the first content element is selected during presentation of the video content item at the control device;
transmit, to the control device, data regarding one or more additional content items related to the first content element;

subsequent to transmitting the data regarding the one or more additional content items related to the first content element, receive, from the control device, an instruction associated with an additional content item of the one or more additional content items;

generate a corresponding instruction understandable by a controlled device, wherein:

the controlled device is unrelated to the control device;

the controlled device is controllable by the control device; and the corresponding instruction is operable to cause the controlled device to obtain the additional content item at a time or date consistent with the corresponding instruction; and transmit the corresponding instruction to the controlled device.

23. The apparatus of claim 22, wherein the program instructions executed by the processor are further executed to:

establish a communications session with the control device; and establish a communications session with the controlled device.

24. The apparatus of claim 22, wherein:

the corresponding instruction is further understandable by the control device; and the program instructions executed by the processor are further executed to transmit the corresponding instruction to the control device.

25. The apparatus of claim 22, wherein:

the instruction comprises a request to display or store the additional content item; and the corresponding instruction is operable to cause the controlled device to display or store the additional content item.

26. The apparatus of claim 22, wherein:

the instruction comprises a request to modify an operational state of the controlled device; and the corresponding instruction is operable to cause the controlled device to modify the operational state.

27. The apparatus of claim 22, wherein the program instructions executed by the processor are further executed to:

detect a gesture based on the instruction; and correlate the detected gesture with a modification to the state of the controlled device.

* * * * *

UNITED STATES PATENT AND TRADEMARK OFFICE
CERTIFICATE OF CORRECTION

PATENT NO. : 9,078,082 B2
APPLICATION NO. : 12/890244
DATED : July 7, 2015
INVENTOR(S) : Gill et al.

Page 1 of 1

It is certified that error appears in the above-identified patent and that said Letters Patent is hereby corrected as shown below:

Title Page, Item (75) Inventor is corrected to read:
-- Sunbir Gill, Seattle (WA);
Anna Dorothy Bell, Bellevue (WA);
Piragash Velummylum, Seattle (WA);
Ethan Z. Evans, Snoqualmie (WA);
Lars Brubaker, Trubuco Canyon (CA) --.

Signed and Sealed this
First Day of December, 2015

Michelle K. Lee
*Director of the United States Patent and Trademark Office*